United States Patent [19]

Inoue et al.

[11] Patent Number: 5,083,209
[45] Date of Patent: Jan. 21, 1992

[54] VIDEO CAMERA

[75] Inventors: Tatsuo Inoue, Tokyo; Tsutomu Niimura, Kanagawa, both of Japan

[73] Assignee: Sony Corporation, Tokyo, Japan

[21] Appl. No.: 614,046

[22] Filed: Oct. 31, 1990

Related U.S. Application Data

[63] Continuation of Ser. No. 330,639, Mar. 30, 1989, abandoned.

[30] Foreign Application Priority Data

Apr. 6, 1988 [JP] Japan .................................. 63-83036

[51] Int. Cl.⁵ .......................................... H04N 5/238
[52] U.S. Cl. ................................ 358/228; 358/213.19
[58] Field of Search ........................................ 358/228

[56] References Cited

U.S. PATENT DOCUMENTS

| | | | |
|---|---|---|---|
| 4,455,068 | 6/1984 | Izuhara | 354/289.12 |
| 4,471,383 | 9/1984 | Shiono et al. | 358/228 |
| 4,534,639 | 8/1985 | Konishi et al. | 354/443 |
| 4,554,587 | 11/1985 | Ooi et al. | 358/228 |
| 4,689,689 | 8/1987 | Saito et al. | 358/228 |
| 4,714,966 | 12/1987 | Saito et al. | 358/228 |
| 4,734,777 | 3/1988 | Okino et al. | 358/228 |

Primary Examiner—James J. Groody
Assistant Examiner—Sherrie Hsia
Attorney, Agent, or Firm—Hill, Van Santen, Steadman & Simpson

[57] ABSTRACT

An automatic exposure control type video camera is designed to cope with the problem of deterioration in the image quality, for an object of higher brightness, by an arrangement in which a diaphragm is actuated when the brightness of the object light is below a predetermined threshold value, and in which the shutter speed is changed when the brightness of the object light is above the predetermined threshold value. More particularly, when the brightness of the object light is below a predetermined value, the shutter speed is set so as to remain constant and rotary diaphragm vanes, for example, are actuated mechanically to control the opening size of the diaphragm to limit the volume of incident light on the image sensing device. Conversely, when the brightness of the object light exceeds a predetermined value and the opening size of the diaphragm vanes reaches a predetermined value, the diaphragm is set so as to remain constant and the shutter is actuated to control the exposure time of the image sensing device to limit the incident light volume.

6 Claims, 2 Drawing Sheets

VIDEO CAMERA

This is a continuation of application Ser. No. 330,639, filed Mar. 30, 1989, now abandoned.

FIELD OF THE INVENTION

This invention relates to an automatic exposure control type video camera and more particularly to a novel video camera in which an electronic shutter system is applied to exposure control.

DESCRIPTION OF THE PRIOR ART

In an automatic exposure control type video camera in general, it is known to provide a mechanical diaphragm system making use of, for example, rotary diaphragm vanes, in an optical system, and to adjust the mechanical size of the vanes automatically as a function of the brightness and the light volume of an object to control thereby the incident light volume to determine optimum exposure.

However, with increases in sensitivity of the image sensing devices, such as charge coupled devices or CCDs, it has become necessary to cope with deterioration in the image quality especially when the object is of a high brightness.

For example, when it is attempted to photography the blue bright sky, the opening size of the diaphragm becomes extremely small due to the elevated sensitivity of the image sensing device with the result that the image becomes blurred on account of the phenomenon of diffraction, causing deterioration in the image quality. Also, when it is attempted to photograph an object of high brightness, such as the sun, the opening size of the diaphragm becomes extremely small so that the opening size of the diaphragm is drastically changed by only the slightest motion with the result that changes in brightness, known as hunting, are frequently observed. This means that, although the image usually becomes clearer with a decrease in the opening size of the diaphragm, limitations are placed on this well-known phenomenon.

The conventional practice for coping with this inconvenience is to provide an ND filter with the rotary diaphragm vanes.

However, the ND filter cannot be said to be an effective measure to cope with the aforementioned deterioration in the image quality because such filter may cause ghosts or flares or may worsen blurring. This technique also results in increase in manufacture costs and the tendency to cause troubles in the diaphragm operation.

OBJECT AND SUMMARY OF THE INVENTION

In view of the foregoing, it is a principal object of the present invention to provide a video camera in which the problem of deterioration in the image quality of an object of higher brightness may be eliminated without making use of ND filters.

It is another object of the present invention to provide a video camera in which an optimum exposure may be achieved over a wide range.

According to the present invention, there is provided a video camera comprising diaphragm means, an image sensing device and shutter means, wherein for adjusting the volume of the incident light on said image sensing device, said diaphragm means is actuated, with the shutter speed remaining constant, when the brightness of the object light is below a predetermined value and the speed of said shutter means is changed, with the opening size of the diaphragm remaining constant, when the brightness of the object light is above said predetermined value.

That is, in the conventional video cameras, a system is adopted in which the shutter speed remains constant and the volume of the incident light on the image sensing device is controlled by the opening size of the rotary diaphragm vanes. According to the present invention, the function of changing the shutter speed in the exposure control system makes it possible to cope with an object of higher brightness.

In the video camera of the present invention, when the brightness of the object light is below a predetermined value, the shutter speed is set so as to remain constant and rotary diaphragm vanes, for example, are actuated mechanically to control the opening size of the diaphragm for limiting the volume of incident light on the image sensing device.

Conversely, when the brightness of the object light exceeds a predetermined value and the opening size of the diaphragm vanes reaches a predetermined value, the diaphragm is set so as to remain constant and the shutter is actuated to control the exposure time of the image sensing device for limiting the incident light volume.

In the video camera of the present invention, exposure control is performed by diaphragm means for an object of lower brightness and by the shutter speed for the object of higher brightness, so that it becomes possible to suppress deterioration in the image quality of the object of higher brightness caused by diffraction or hunting.

Also, in the video camera of the present invention, since ND filters or similar separate units may be omitted, there is no risk of the formation of ghosts or flares or blurring of the image, while there is also little increase in manufacture costs, and reliability is maintained.

Thus, the present invention provides a video camera which can cope with an object over a wide range and which has a high picture quality and a high operational reliability.

DESCRIPTION OF THE PREFERRED EMBODIMENT

Figure 1:
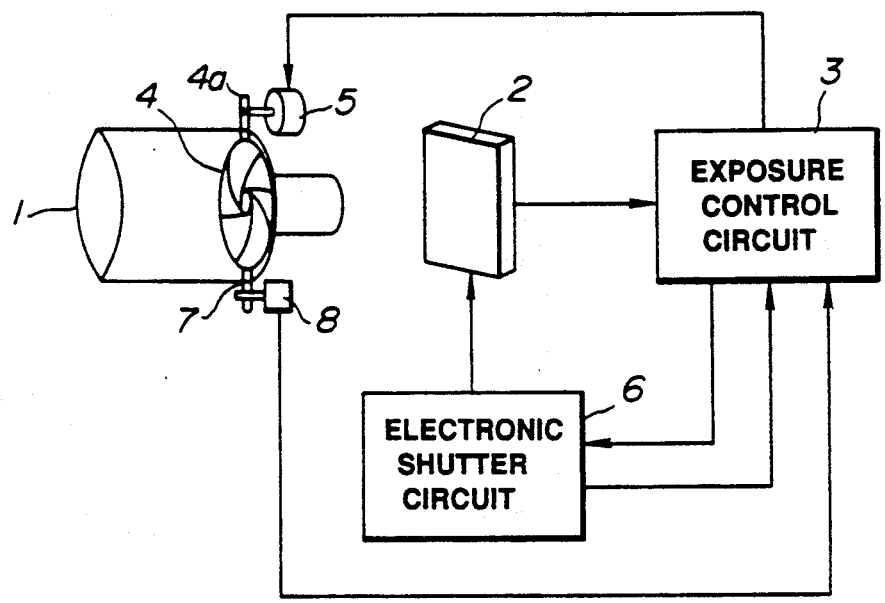
FIG. 1 is a diagrammatic view showing an embodiment of an exposure control system of a video camera according to the present invention.

By referring to the drawings, an illustrative embodiment of the present invention will be explained in more detail.

FIG. 1 shows a video camera of the present invention including an optical system 1, such as a zoom lens, a solid state image sensing device 2 for converting the incident light into electrical signals, herein a charge coupled device or CCD, and an exposure control circuit 3 for automatically controlling the exposure in dependence upon the incident light brightness. The exposure control circuit may incorporate light sensing means for developing a signal proportional to the object brightness. Alternatively, a signal indicative of the object brightness may be derived from the output of the CCD, and from the known position of the diaphragm vanes 4.

To the exposure control circuit 3, there are connected an iris meter 5 for mechanically actuating rotary diaphragm vanes 4 as a first exposure control mechanism and an electronic shutter circuit 6 as a second exposure control mechanism. The iris meter 5 is adapted to turn an actuating lever 4a connected to the vanes 4 to adjust the opening size or diameter of the diaphragm vanes 4, and the electronic shutter circuit 6 is adapted to control the charge storage time in the solid state image sensing device 2 to control the shutter speed.

The mechanical operation of the diaphragm vanes 4 is limited by abutment of a lever 7 of a limit switch 8 operatively associated with the diaphragm. This state of abutment is transmitted by the limit switch 8 to the exposure control circuit 3 in such a manner as to switch or commutate an exposure control mechanism connected to the exposure control circuit 3. Although the lever 7 and the lever 4a acted on by the iris meter 5 are provided as separate elements, these may also be united as that one of the levers may also play the part of the other lever.

The operation of the exposure control mechanism in the above described video camera will be hereinafter explained.

In a region of lower brightness of an object, exposure is controlled by the opening size or diameter of the diaphragm vanes 4. Thus, the light from the object passing through the optical system 1 including a zoom lens, for example, falls on the solid state image sensing device 2. On reception of the brightness signals from the solid state image sensing device 2, the exposure control circuit 3 controls the iris meter 5 so as to maintain a constant light volume from the object, while the diaphragm vanes 4 are driven into operation. When the brightness of the object is low, the opening size of the vanes 4 is increased. As the brightness of the object is increased, the opening size of the vanes becomes smaller.

Figure 2:
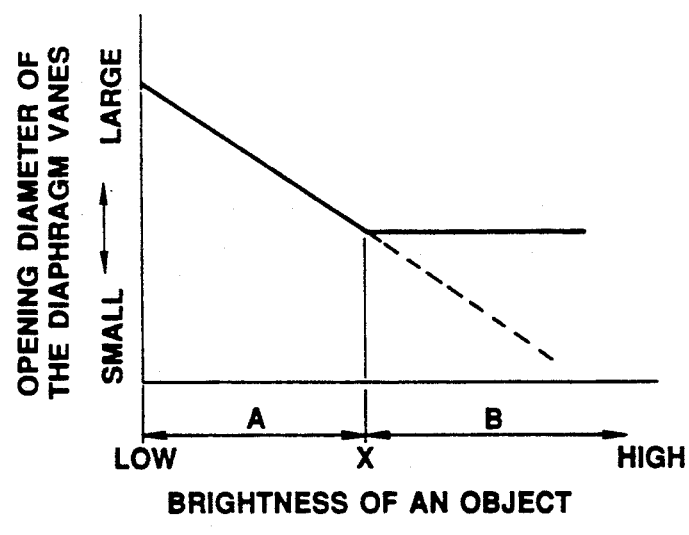
FIG. 2 is a diagram for illustrating the operation of the diaphragm vanes of the control system shown in FIG. 1.

FIG. 2 shows the opening diameter of the vanes 4 relation with the brightness of the object. In the region of the lower object brightness A, the opening diameter of the vanes 4 is decreased gradually as the brightness increases. The shutter speed of the solid state image sensing device 2 at this time is constant and set for example to 1/60 of a second.

When the opening size of the vanes 4 is decreased further and the lever 7 moved by being operatively connected to the vanes 4 reaches the operating point of the limit switch 8, the opening size of the vanes 4 is no longer decreased and limited to a predetermined value. Thus, in FIG. 2, a point X represents the operating point for the limit switch 8, beyond which the opening size of the diaphragm vanes 4 is maintained at a constant value even when the brightness of the object is increased. In the conventional video camera adapted to control exposure only by the diaphragm vanes 4, the diaphragm size is decreased further in the high brightness region B, as indicated by a broken line in FIG. 2, thus in a manner different from the present embodiment in which the diaphragm size remains constant in the higher brightness region B.

It will be noted that the lower limit of the opening diameter of the diaphragm vanes 4 imposed by the limit switch 8 may be set to about 5 mm, at which deterioration in the picture quality by diffraction or hunting may be prevented.

When the lever 7 associated with the diaphragm reaches the operating point of the limit switch 8, a signal is transmitted from the switch 8 to the exposure control circuit 3 to terminate the operation of the iris meter 5 and to actuate the electronic shutter circuit 6.

Figure 3:
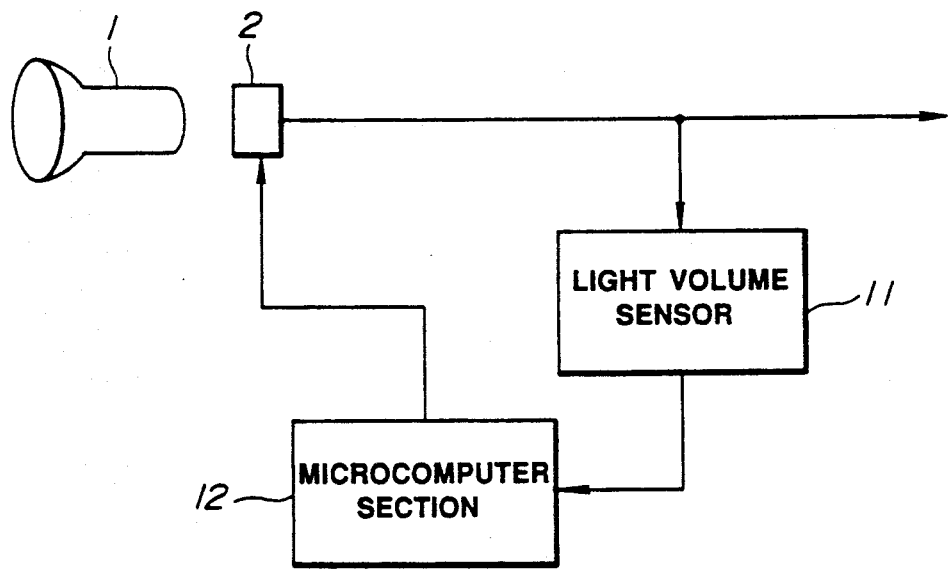
FIG. 3 is a circuit diagram of an electronic shutter circuit.
Figure 4A:
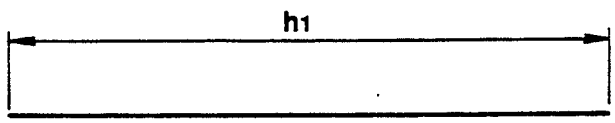
FIGS. 4A to 4C illustrate changes in the light exposure time of a solid state image sensing device caused by $\Delta V_{sub}$ pulses.
Figure 4B:
Figure 4C:
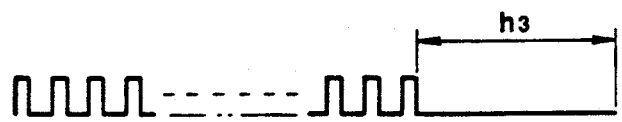

As shown diagrammatically in FIG. 3, the electronic shutter circuit 6 may be said to be a species of an AGC circuit and operates in such a fashion that the volume of an incident light on the solid state image sensing device 2 is sensed by a light volume sensor 11 and a predetermined number of pulses $\Delta V_{sub}$ are established from a microcomputer section 12 as a function of the dc voltage outputted from the sensor 11 for controlling the overflow drain of the solid state image sensing device 2 to limit the charge storage time, that is, the exposure time. Hence the exposure time of the solid state image sensing device 2 is controlled by steps of horizontal transfer periods in association with the number of $\Delta V_{sub}$ pulses. For example, when no $\Delta V_{sub}$ pulses are established, as shown in FIG. 4A, electrical charges are stored during one field period, such that the shutter speed or the exposure time $h_1$ is 1/60 of a second. With increase in the number of $\Delta V_{sub}$ pulses, as shown in FIG. 4B or 4C, the charge storage time becomes shorter, such that, in FIG. 4B, the exposure time $h_2$ is 1/100 of a second and, in FIG. 4C, the exposure time $h_3$ is 1/1000 of a second.

In this manner, after actuation of the limit switch 8, the shutter speed of the solid state image sensing device 2 is continuously changed by the electronic shutter circuit 6 from 1/60 of a second to, for example, about 1/500 of a second, by steps of horizontal transfer periods, such that, even when the vanes 4 are stopped at a constant opening diameter and the object brightness is changed continuously, the volume of the light falling on the device 2 is maintained at a constant value.

Conversely, when the object brightness is changed from a higher value to a lower value, the opening size of the vanes 4 remains constant until the shutter speed of the device 2 controlled by the electronic shutter circuit 6 reaches the value of 1/60 of a second. When the shutter speed reaches 1/60 of a second, a signal is transmitted to the exposure control circuit 3 for actuating the iris meter 5 to open the vanes 4, with the shutter speed remaining at this time at a constant value of 1/60 of a second.

Although the present invention has been described with reference to illustrative embodiments thereof, the present invention is not limited thereto and the construction of the diaphragm, electronic shutter circuit or the optical system can be changed suitably without departing from the purpose of the invention.

What is claimed is:

1. A video camera for producing video signals corresponding to sequential video frames on a continuous basis, comprising diaphragm means, an image sensing device and electronic shutter means incorporating a microcomputer, and means operatively connecting said image sensing device with said diaphragm means and said electronic shutter means, wherein for adjusting the volume of the incident light on said image sensing device, said diaphragm means is actuated, with the shutter speed remaining constant, when the brightness of the object light is below a predetermined value; and the speed of said shutter means is changed, with the opening size of the diaphragm remaining constant, when the brightness of the object light is above said predetermined value, whereby deterioration of the image quality of said video signals for objects of relatively high brightness, due to hunting, is avoided.

2. The video camera according to claim 1, wherein said image sensing device is a solid state image sensing device, and said shutter means is an electronically controlled shutter, adapted to control the charge storage time in the solid state imaging device, to control the shutter speed.

3. The video camera according to claim 2 wherein said solid state image sensing device is a charge coupled device, and said electronic shutter means controls the charge storage time of said charge coupled device.

4. The video camera according to claim 1, wherein said constant shutter speed is set to 1/60 of a second.

5. The video camera according to claim 1, wherein said diaphragm means comprises mechanically operated diaphragm vanes and said constant opening size of the diaphragm is set to approximately 5 mm.

6. The video camera according to claim 1, wherein the brightness of the object light is detected by an exposure control circuit adapted to measure output signals from said image sensing device.

* * * * *